(No Model.)  3 Sheets—Sheet 2.

J. MILLER.
SHEAF CARRIER FOR HARVESTERS AND BINDERS.

No. 366,595. Patented July 12, 1887.

(No Model.) 3 Sheets—Sheet 3.

J. MILLER.
SHEAF CARRIER FOR HARVESTERS AND BINDERS.

No. 366,595. Patented July 12, 1887.

Witnesses:

Inventor:
Jacob Miller,
By S. M. Grusabaugh
Attorney.

UNITED STATES PATENT OFFICE.

JACOB MILLER, OF CANTON, OHIO.

SHEAF-CARRIER FOR HARVESTERS AND BINDERS.

SPECIFICATION forming part of Letters Patent No. 366,595, dated July 12, 1887.

Application filed October 2, 1884. Serial No. 144,558. (No model.)

*To all whom it may concern:*

Be it known that I, JACOB MILLER, a citizen of the United States, residing at Canton, in the county of Stark and State of Ohio, have invented certain new and useful Improvements in Sheaf-Carriers for Harvesters and Binders, of which the following is a specification, reference being had therein to the accompanying drawings.

My invention relates to improvements in sheaf-carriers for harvesting and binding machines.

The object of my invention is to provide a simple and effective means for holding the sheaves or bundles of grain after they leave the binding mechanism until a number of them have accumulated in the carrier, and in providing means for the speedy removal of the sheaves or the unloading of the carrier.

My invention consists in a sheaf-carrier frame adjustably secured to the harvester, whereby the carrier can be held at any desired angle or inclination, and a tilting sheaf-carrier pivotally secured to said adjustable frame.

My invention consists, further, in pivoting a lever to the side of the machine, which engages with the front end of the carrier to hold it in its lower or depressed position, which, when pressed outward, releases the front end of the carrier and permits the carrier to tilt to relieve it of the load of bundles.

My invention consists, further, in connecting to the under side of the front portion of the carrier a series of bent fingers or tines, which, when the carrier is in position for receiving the bundles, project upward through the rear portion of the carrier to hold the bundles in the carrier and prevent them from falling or working over the rear end of the carrier.

My invention consists, further, in certain details of construction, which will be fully described, and pointed out in the claims.

Figure 1:
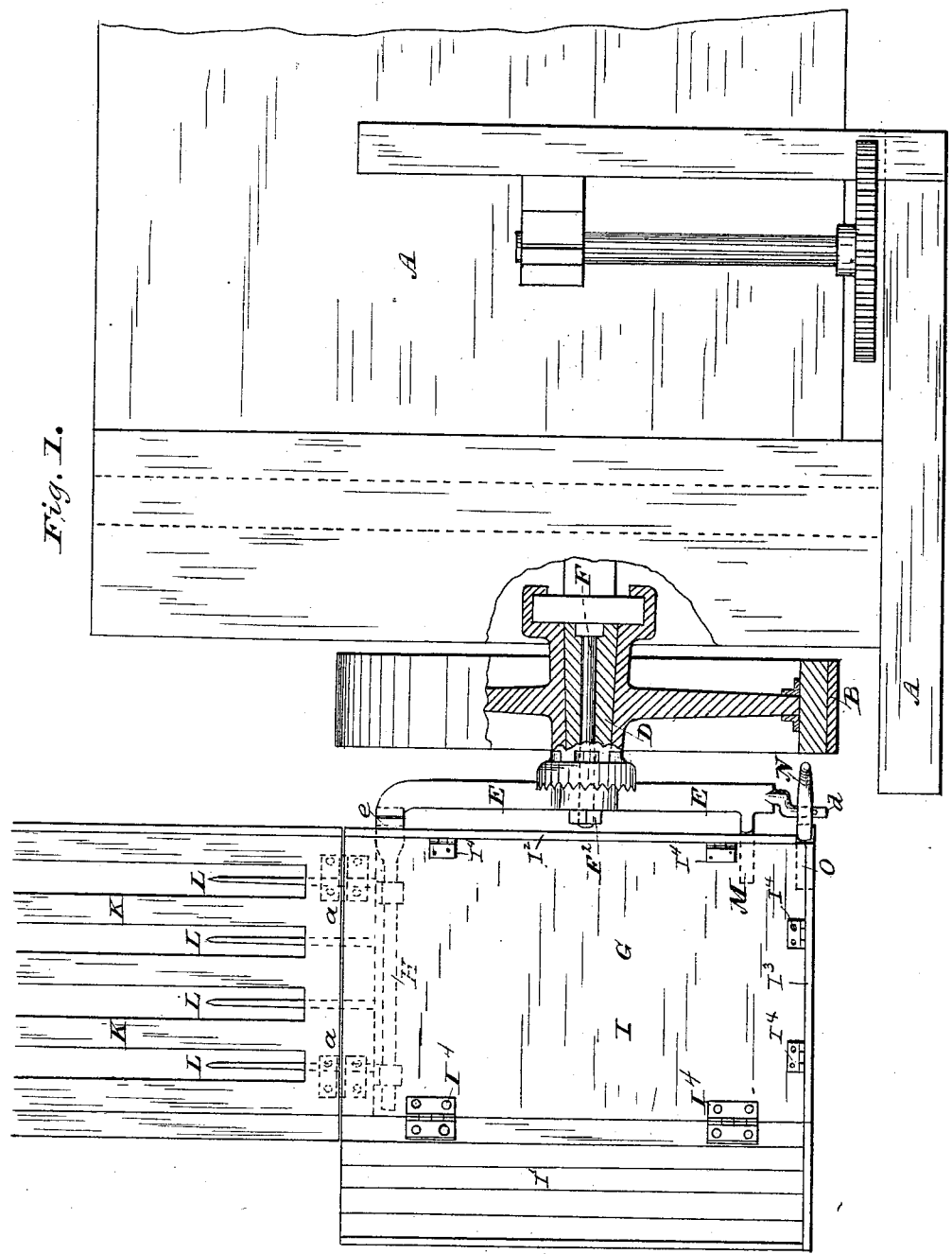
Figure 2:
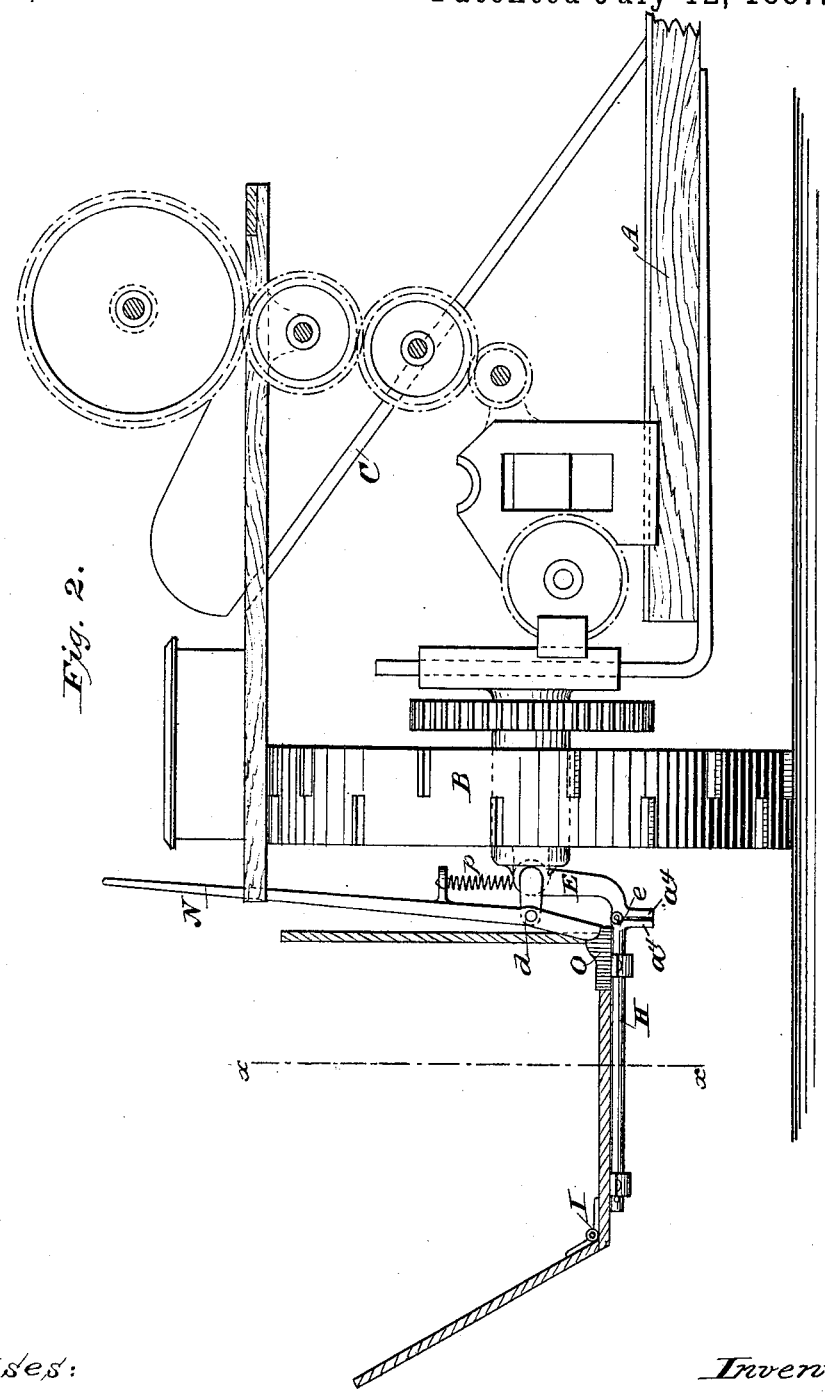
Figure 3:
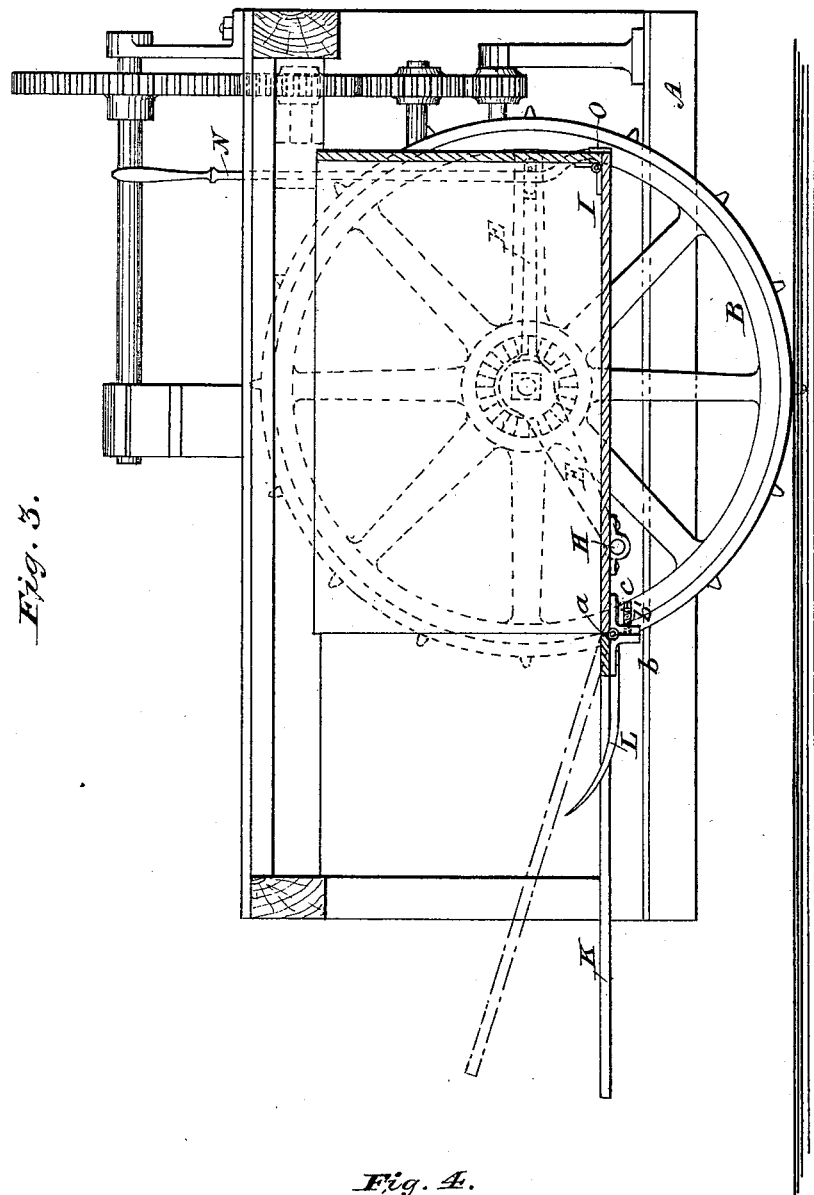
Figure 4:
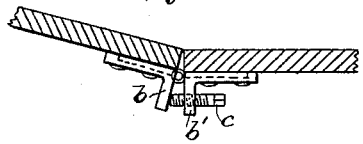

Figure 1 is a top or plan view with the main driving-wheel of the harvester-machine in section, showing the connection of the axle with the arm which supports the carrier. Fig. 2 is a front view of the machine, showing the carrier supporting-bar and tripping-lever. Fig. 3 is a longitudinal sectional view on the line *x x* of Fig. 2. Fig. 4 is a detached view of the brackets and screw for adjusting the rear section.

In describing my invention I have shown only so much of a harvesting and binding machine as is necessary to a clear understanding of my invention, and only such parts as are necessary to the description will be referred to by letter.

A is the frame-work, B the driving-wheel, C the incline on which the grain is gathered and bound, all of which are of the ordinary construction.

D is the axle on which the main driving-wheel is mounted, one end of which is rigidly secured to the frame of the machine, while the outer end is provided with a head having a series of teeth or indentations, against which a correspondingly-serrated bar E is held by means of the bolt F, which passes into or through the axle D in a longitudinal direction, thus providing a safe and reliable means of support for the arm E and the carrier to be held thereon, which I will now proceed to describe in detail.

G is the sheaf-carrier, and is secured to the projecting arm H of the bar E in such a manner that the sheaf-carrier will turn thereon when it is desired to free it from its load of sheaves. The carrier G is composed of two sections, I and K, the section I being pivoted upon the arm H, as heretofore described, while the section K is hinged at *a* to the rear end of the section I.

The section I of the carrier is of a box or trough like form, having two sides and closed at the front end, while the section K is composed of slats, for reasons which will more fully appear.

The front end of section K and rear end of section I are each provided with one or more downwardly-projecting lugs, *b b'*, respectively. The lugs *b'* are provided with screw-threaded openings for the reception of the screw-nut *c*, by which means the section K can be adjusted to any angle desired, so as to prevent the sheaves from working off while the machine is working up the side of a hill. As a further protection to prevent the sheaves from working back over the end of the carrier, I attach to the under side of section I a series of bent tines, L, the rear ends of which project through and slightly above the slatted floor of the section K when the carrier is receiving the sheaves from the binder; but when the carrier is tilted to free it of its load of sheaves the ends of the tines are drawn below the surface of the slats of section K, and the sheaves are permitted to slide off onto the ground.

The sheaf-carrier, being divided into two sections and hinged together, as described, permits the front end of the forward section I to rise up and slide the sheaves rearward, and at the same time depress the rear section so that it will strike the ground, or nearly so, thus permitting the stubble and the frictional contact with the ground to draw the sheaves off the rear end of the carrier.

The section I is made heavier than the rear section, K, so that when the carrier is freed from its load of sheaves the section I will fall forward by its own gravity and bring the carrier into a proper position to receive the sheaves from the binder.

The front end of the carrier is supported by an arm, M, which projects from the bar E, near its forward end.

N is a hand-lever pivoted to the end of the bar E at $d$, the lower end of which lever is kept in contact with the catch or lug O of the carrier by means of the spring $p$, so that when the section I tilts forward after having dumped the load of sheaves it will be caught by the lower end of the lever and held in position until the upper end of the lever N is pushed outward by the operator, when the weight of the accumulated load of sheaves will cause the carrier to tilt and free itself, as before stated.

The sides $I'$ and $I^2$ and end $I^3$ of section I are hinged at $I^4$ to the bottom, so that they can be folded down on each other. The arm H is hinged to the bar E at $e$, the arm H and bar E being provided with extensions $a^4$ below the hinged or pivotal point $e$, which, when brought together, as shown, by lowering the carrier prevents the arm H from falling below a horizontal line, but which will admit of the carrier, when its sides are folded, being raised up or turned over out of the way, so that the machine can be readily taken through a gate.

By serrating the end of the axle D and the side of the bar E, I am enabled, by unscrewing the nut $F^2$ on the bolt F, to adjust the bar E at any desired angle and hold it securely in such position.

The operation of my device is as follows: The carrier being in a horizontal position, or in position for being loaded with sheaves or bundles of grain, as shown in the figures of the drawings, the sheaves are thrown from the binder or binding devices into the carrier by devices well known in this class of machines until the desired number of sheaves have been placed therein. The operator then pushes the upper end of the lever N outward, so that the lower end of the lever will be released from the catch O on the section I. The weight of the sheaves in the carrier causes it to tip rearward, bringing the section K down into the stubble, depressing the outer ends of the fingers or tines L below the surface of the slats of section K, so that the frictional contact of the sheaves with the stubble and the ground will drag the sheaves from off the carrier. After the carrier has been freed from the weight of the sheaves, the preponderating weight of the front end of section I will bring the carrier into a horizontal position again, ready to receive another load of sheaves, and is locked in such position by the lower end of the lever N, or other equivalent device.

Having thus described my invention, what I claim, and desire to secure by Letters Patent, is—

1. The combination, with a harvester, of a sheaf-carrier frame adjustably secured to the harvester, whereby the carrier can be inclined from front to rear, and a tilting sheaf-carrier pivotally secured to said carrier-frame, substantially as set forth.

2. The combination, with a harvester-frame, of a sheaf-carrier frame adjustably secured to the harvester, whereby the carrier can be inclined from front to rear, and a sheaf-carrier made in two sections and pivotally secured to said sheaf-carrier frame, substantially as set forth.

3. The combination, with the main axle of a harvester, provided at its outer end with a head having a series of teeth in the outer face thereof, of a carrier-frame having a corresponding series of recesses adapted to register with the teeth on the axle, whereby said frame can be inclined from front to rear, a bolt for locking the carrier-frame to the axle, and a bundle-carrier pivotally secured to said frame, substantially as set forth.

4. The combination, with a harvester-frame, the latter carrying a serrated or toothed plate, a carrier-frame having a serrated plate, the teeth of which are adapted to register with the teeth of the serrated plate on the harvester, and a bolt for locking the carrier-frame to the harvester, of a sheaf-carrier made in two sections pivotally supported on said carrier-frame, and having the front section made heavier than the rear section, whereby the carrier may automatically return to its normal position after being tilted to discharge its load, substantially as set forth.

5. A sheaf-carrier for harvesting-machines made in two sections pivoted to the side of the machine and made adjustable in relation to each other, substantially as described, whereby the rear section may be adjusted to any desired angle in relation to the front section, as set forth.

6. In a sheaf-carrier for harvesting-machines, the sections I and K, hinged together, as described, and provided with the lugs $b$ and $b'$, in combination with the set-screw $c$, whereby the angle of the section K with relation to the section I can be changed, as set forth.

7. In a sheaf-carrier, the combination, with the axle D and bar E, connected to the sheaf-carrier, substantially as described, said bar being provided with serrations, of the block F and nut $F^2$, for permitting the bar to be adjusted on the axle, as set forth.

In testimony whereof I affix my signature in presence of two witnesses.

JACOB MILLER.

Witnesses:
 JNO. M. WELLS,
 ROBT. A. MILLER.